April 13, 1954  G. A. LYON  2,674,787
METHOD OF MAKING WHEEL TRIM
Filed Dec. 22, 1948  4 Sheets-Sheet 1
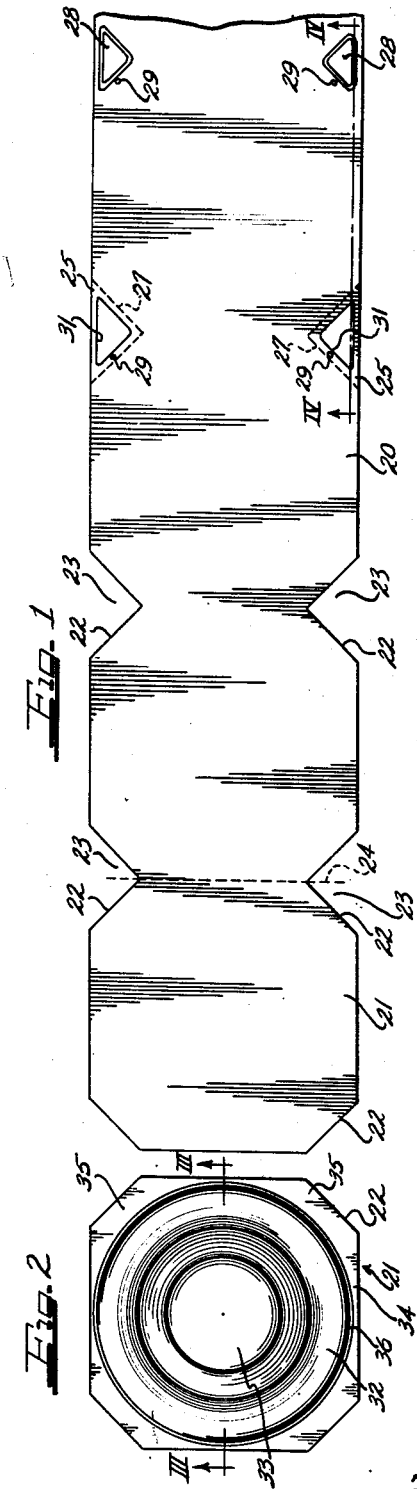
Inventor
GEORGE ALBERT LYON
by The Firm of Charles W. Hills Attys.

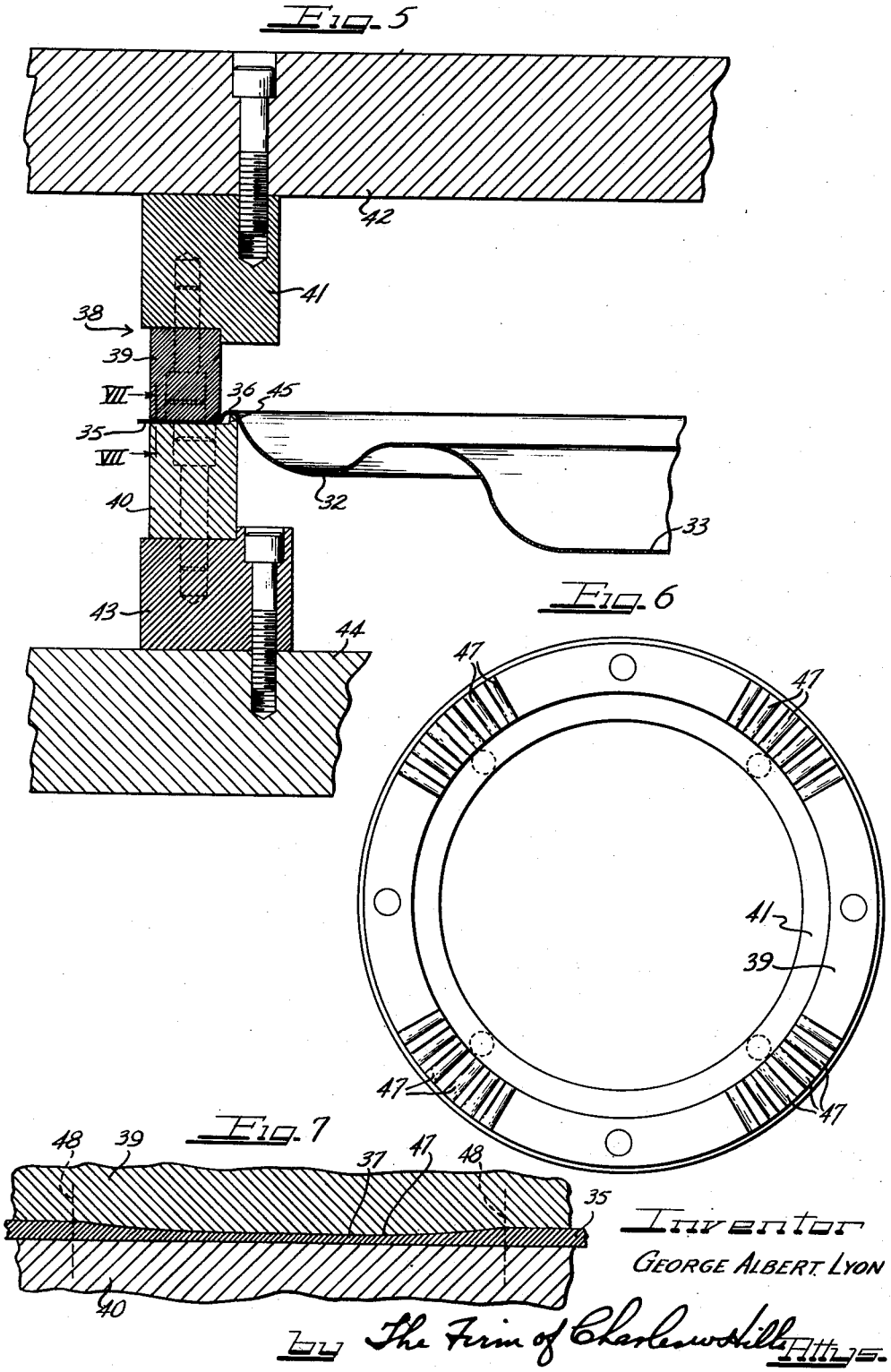

April 13, 1954  G. A. LYON  2,674,787
METHOD OF MAKING WHEEL TRIM
Filed Dec. 22, 1948  4 Sheets-Sheet 3

Inventor
GEORGE ALBERT LYON
by The Firm of Charlesworth Attys.

April 13, 1954  G. A. LYON  2,674,787
METHOD OF MAKING WHEEL TRIM
Filed Dec. 22, 1948  4 Sheets-Sheet 4

Inventor
GEORGE ALBERT LYON
by The Firm of Charles W Hills
Attys.

Patented Apr. 13, 1954

2,674,787

UNITED STATES PATENT OFFICE 2,674,787

METHOD OF MAKING WHEEL TRIM

George Albert Lyon, Detroit, Mich.

Application December 22, 1948, Serial No. 66,763

4 Claims. (Cl. 29—159)

The present invention relates to improvements in the manufacture of metal articles and more especially relates to the manufacture of wheel trim from sheet material.

An object of the invention is to provide an improved method of making wheel trim.

Another object of the invention is to provide a novel method of making wheel trim to provide an outer turned edge thereon formed with retaining finger extensions.

A further object of the invention is to provide an improved method of making wheel trim with self-retaining marginal finger extensions from sheet metal that is of insufficient inherent resilience for proper functioning of the retaining fingers, but according to which method the portions of a metal blank providing the retaining fingers are coined to impart sufficient hardness and resilience to the finger extension areas for proper functioning in service.

Other objects, features and advantages of the present invention will be readily apparent from the following detailed description taken in conjunction with the accompanying drawings, in which:

Figure 1 is a plan view of a sheet metal strip showing various successive steps in the present method of manufacturing sheet metal articles;

Figure 2 is a plan view of a blank as derived from the sheet metal strip of Figure 1 and after the blank has been subjected to a drawing process;

Figure 3 is an enlarged transverse sectional view taken substantially on the line III—III of Figure 2;

Figure 4 is a fragmental enlarged sectional detail view taken substantially on the line IV—IV of Figure 1;

Figure 5 is a fragmentary vertical sectional view through the blank of Figs. 2 and 3 and showing the same in process of being selectively coined at the margin thereof;

Figure 6 is a face elevational view of one of the coining dies of Figure 5;

Figure 7 is a substantially enlarged fragmentary sectional view taken substantially on the line VII—VII of Fig. 5 and showing a selected coining area of the coining dies;

Figure 10:
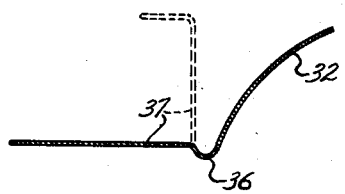
Figure 11:
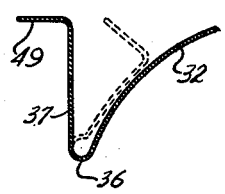
Figure 12:
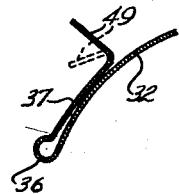
Figure 13:
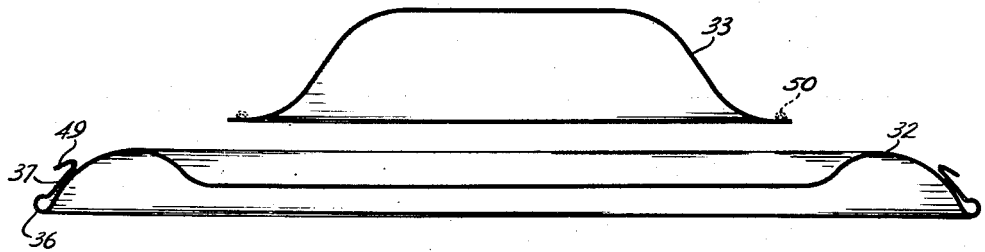
Figure 15:
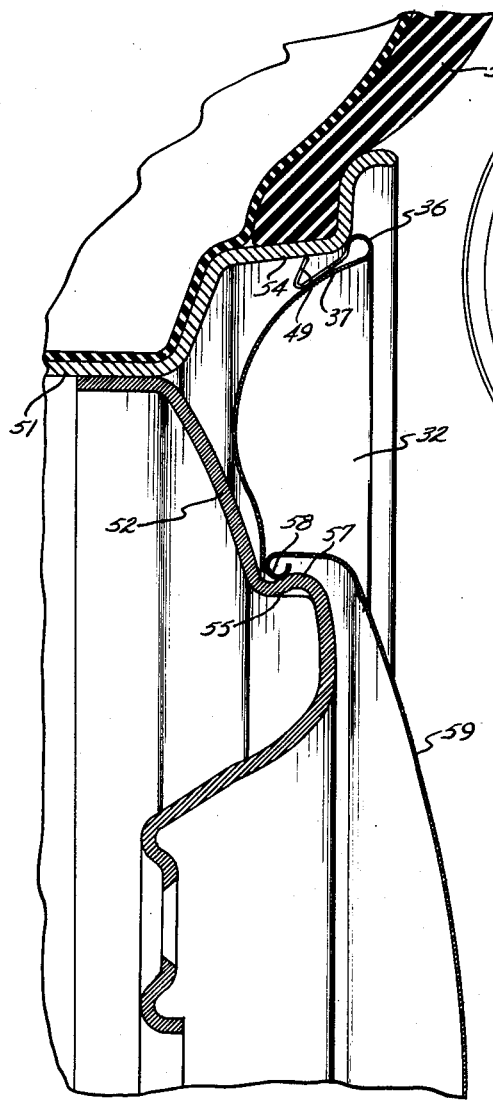
Figure 14:
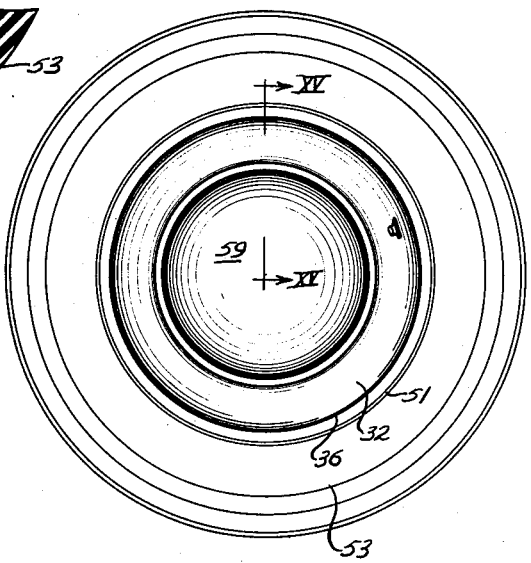
Figure 16:
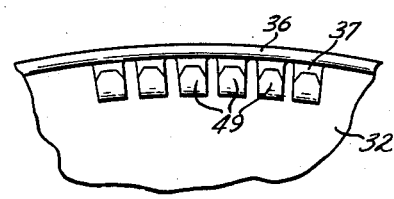

Figures 10, 11 and 12 disclose successive steps in formation of the coined finger portions of the blank;

Figure 13 discloses how the blank is finally separated and a pair of articles formed therefrom;

Figure 14 is a side elevational view of a vehicle wheel showing the wheel trim derived from the present method as applied to the wheel;

Figure 15 is an enlarged radial sectional view taken substantially on the line XV—XV of Figure 14; and Figure 16 is a fragmentary rear elevational view of the wheel trim showing a set of the coined retaining fingers.

As shown on the drawings:

In the initial stages of the present method, a sheet metal strip 20 of appropriate width is progressively divided into a series of blanks 21 of generally rectangular shape but having the corners truncated as at 22 (Fig. 1). The most expeditious manner of effecting the corner truncation is by notching out the metal strip triangularly in alignment at its opposite margins as indicated at 23. Severance of the individual blanks 21 from the strip is then effected on severance lines 24 by shearing between the re-entrant points of the triangular notch outs 23.

Since in the formation of the notches 23, triangular portions 25 of the material are severed from the sheet along angular severance lines 27, and such severed portions 25 would ordinarily constitute scrap the present invention contemplates advantageously utilizing the cutout portions. To this end, the respective areas from which the portions 25 are to be cut are processed prior to severance from the sheet into useful article form as by drawing the same into respective articles 28 (Figs. 1 and 4). As shown, the articles comprise triangularly shaped dishlike structures which may serve a variety of uses, such as for ash trays, dust caps for machinery, or the like. For guidance of the forming dies, respective pilot holes 29 are punched in the sheet within the margin of the area subsequently to be severed out as the scrap cut out 25 in each instance. Thus, the metal sheet 20 is advanced step by step through a progressive die assembly wherein at proper successive intervals the articles 28 are drawn in the respective opposite margins of the sheet 20 after which the articles 28 are severed from the sheet on respective severance lines 30, leaving marginal openings 31 in the sheet within the portions 25 which are thereafter severed on the respective severance lines 27 to provide the notches 23. As a result, only a very narrow marginal triangle of scrap is actually cut out in forming the notches 23 in the sheet of material.

Each of the blanks 21 is drawn to shape, preferably in a single draw to provide an annular outer rib-like portion 32 of substantially concave-convex cross section and a central generally flat crowned portion 33 (Figs. 2 and 3). Circumscribing the annular portion 32 is the original margin of the blank comprising a hold down flange 34 having juncture with the portion 32 through the medium of an annular juncture reinforcing rib 35 of relatively small radius. At the corners of the blank the flange 34 affords four corner areas 36 of substantial width and breadth.

According to the present invention, at least the annular portion 32 of the formed blank is intended to provide a wheel cover or trim member of the kind which is self-retaining on a vehicle wheel. In such a cover structure marginal retaining fingers are provided which are engageable in retaining wedging relation with a portion of the vehicle wheel such as the intermediate flange of the tire rim of the wheel. To be effective, the retaining fingers must possess a fair degree of stiffness and resilience. However, where the material from which the cover is made is inherently of a hardness and resilience appropriate for the retaining fingers, complications arise in the drawing process since it is much more difficult to draw such a material, substantially greater power, and harder die equipment being required than for a softer material. Moreover the cost of such a material is appreciably greater than a softer material. Actually, only relatively small areas of the total blank need be of the stiffness and resiliency desirable for the fingers while a relatively softer and less expensive material will suffice for the remainder of the finished article. By the present invention proper steps are taken in recognition of this fact to produce the article with utmost economy from an appropriate relatively soft material, such as a soft grade of stainless steel, for example, with the attendant economy and speed of production, while nevertheless those relatively small areas requiring ultimate stiffness and resiliency are treated to have the desired characteristics.

Figure 8:
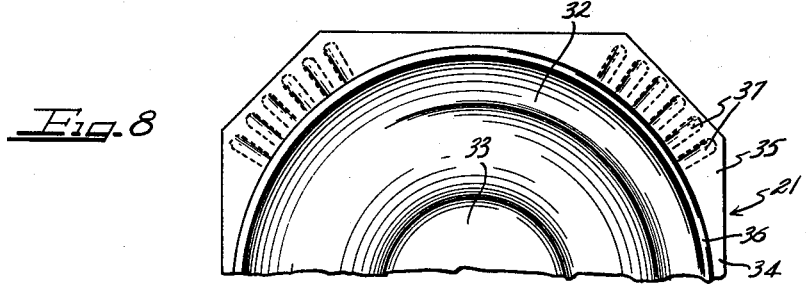
Figure 8 is a fragmentary plan view of the blank of Figure 2 showing the same after completion of the marginal coining operation.

In carrying out the invention with respect to providing local areas thereof with enhanced resilient characteristics to provide for the retaining fingers, the corner areas 35 of the marginal flange of the drawn blank are subjected to a coining action wherein the metal thereof is worked and compressed and as a result of which the coined corner portions are substantially stiffened and rendered more resilient. Since actually, in the present instance, only elongated finger portions require the stiffening and resiliency treatment, the corner areas 35 are coined in a series of elongated spaced finger-like areas 37 (Fig. 8) radiating from the periphery defined by the juncture rib 36 in each of the corner areas 35. For example, there may be six of the finger-like spaced areas in each series, corresponding to the number of retaining fingers it is desired to have at each of the four corner areas of the blank and thus in the finished article.

For coining the selected areas of the margin of the blank, the marginal corner areas 35 are subjected to the action of coining means which is shown in Figs. 5, 6 and 7 as a press assembly 38 including opposed, coacting coining ring dies 39 and 40. The die member 39 is supported removably by a pressure ring 41 carried by a ram 42. The die member 40 is carried by a supporting ring 43 mounted on a base 44. The ring die 40 and the supporting ring 43 provide a space therein for receiving the formed, drawn portion of the circular blank, with an upstanding centering rim flange on the inner upper edge of the die member 40 fitting within the groove defined by the marginal rib 35 of the blank to hold the blank centered in the press.

In the present instance, the pressing surface of the lower die member 40 is flat while the pressing surface of the upper die member 39 is formed with groups of radial coining ribs 47 corresponding to the number and location of the retaining finger portions 37 desired in the margin of the blank. As best seen in Fig. 7, the coining ribs 47 are formed as large radius protrusions from the flat face of the ring die 39 and project to a maximum thickness from the plane of said flat face which is preferably less than the thickness of the material of the blank. Hence, when the die rings 39 and 40 are brought together under pressure against the margin of the blank the relatively soft material of the blank is cold worked in the areas engaged by the coining ribs 47 by compacting, flowing and realignment of the grain in the affected areas which causes such areas to be stiffened and hardened and rendered substantially more flexible than the original material thereof and the remainder of the blank of which such areas form part. In the coining operation, moreover, the finger areas have the side thereof which is engaged by the coining ribs 47 reshaped to a concave cross section while the opposite side remains flat. Thus, the longitudinal edges of the coined finger areas are substantially thicker than the inner portions of the finger areas.

Figure 9:
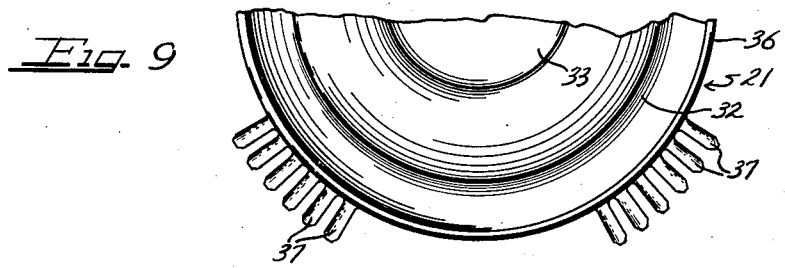
Figure 9 is a fragmentary plan view of the blank following marginal trimming thereof.

Following the coining operation, the margin 34 is trimmed from the blank except for the finger areas 37 which are derived from the corner portions 35 of the marginal flange, the scrap being severed from about the finger areas on severance lines 48 (Fig. 7) at the extreme edges of the coined areas or just slightly outside of the coined areas. Following this trimming operation, the blank appears substantially as seen in Fig. 9 with the coined finger areas 37 projecting radially therefrom.

The fingers 37 are then progressively bent to proper shape as shown in Figs. 10, 11 and 12. Thus, the fingers are bent at their juncture with the rib 36 toward the convex side of the annular trim portion 32 of the blank substantially as shown in dash outline in Fig. 10 and full outline in Fig. 11, and the terminal portion of each finger is bent right angularly outwardly. Thereafter the rib 36 is curled over to provide a substantially closed bead as shown in dash outline in Fig. 11 and full outline in Fig. 12, the main body portions of the fingers being carried over close to the adjacent convex area of the portion 32 of the blank. Finally the terminal portions of the fingers identified at 49 are bent into convergent angularity to the main body portions of the fingers 30, this being the final operative position desired for the fingers for retaining the trim on the wheel to which it may be applied.

Throughout all of the operations up to this point, the annular portion 32 and the crown portion 33 have remained in one piece in the blank. One reason for this is that advantage is thereby gained from the additional rigidity afforded for the annular portion 32 while it is undergoing various forming steps at its margin as already explained. Another reason is that at some time after the drawing operation and preferably after the fingers 37 have been completed, the outer face of the blank is buffed and polished to secure a bright luster thereon, or it is plated and then polished, depending upon the character of the finish desired and the nature of the material used in making the articles. This surface finishing of the blank includes not only the outer surface of the annular portion 32 but also the corresponding surface, in the present instance the reentrant surface of the crown portion 33. Thereafter, the crown portion 33 is severed from the annular portion 32, substantially as shown in Fig. 13, at an intermediate annular line on the juncture area between the two portions. Thereafter the edge of the crown portion 33 may be curled upon itself as indicated at 50 in order to provide a finishing and reinforcing edge bead. The crown portion 33 then provides an attractive metal pan or basin. On the other hand, the crown portion 33 may be formed to provide some other desired article such as a cover member, machine casing component, or the like.

After the crown portion 33 has been severed therefrom, the annular portion 32 provides a completed trim ring in which the retaining fingers 37 are located behind the radially outer marginal portion of the trim ring with the terminal portions 49 extending generally radially outwardly in position for retaining engagement with a portion of a wheel to which the trim ring may be applied. Such a wheel, as shown in Figs. 14 and 15, comprises a tire rim 51 supported by a disk type of body 52. The tire rim is of the multiflange type adapted to support a pneumatic tire and tube assembly 53 and has an intermediate generally axially outwardly extending flange 54 which in the assembly of the trim ring 32 with the wheel is engaged in wedging retaining frictional and gripping manner by the tips of the finger terminals 49. The resiliency and stiffness imparted to the fingers by the coining operation assures that the fingers will retain their grip thoroughly, but at the same time may be pried free by applying and manipulating a pry-off tool such as a screw driver or the like between the edge reinforcing bead 36 and the adjacent portion of the tire rim against which the bead 36 comes to rest when the trim ring is on the wheel.

At its inner margin the trim ring 32 lies adjacent to the wheel body 52 at the base of a generally radially outwardly facing shoulder 55 on the wheel body having a series of retaining bumps 57 thereon by which a beaded margin 58 of a hub cap 59 is retained on the wheel and in bearing relation against the inner margin of the trim ring to hold the same under tension toward the wheel body.

This application is a continuation-in-part of my copending application Serial No. 764,355, filed July 29, 1947, now abandoned.

I claim as my invention:

1. In a method of making a wheel trim by forming a metallic member into a body with cover retaining fingers, the steps of drawing the body of the member to form it into a convex-concave cross-section bounded by an outer peripheral bead from which extends a generally radially outwardly projecting portion, trimming said portion to provide radially extending fingers, bending the fingers intermediately into angular form, bending the fingers angularly relative to said bead and also into proximate relation to the convex back of the body, and bending the finger extremities to decrease the divergent angularity thereof relative to the remaining portions of the fingers as well as to position the terminals of the extremities in spaced relation to said remaining finger portions and said bead for trim retaining engagement with a wheel.

2. In a method of making a wheel trim by forming a substantially soft and easily cold work hardenable sheet metal member into a body with retaining fingers, the steps of drawing the body of the member to form it into a circular shape bounded by an outer peripheral bead from which extends a radially outwardly extending portion, coining and thereby work-hardening narrow spaced radially extending areas of said portion, trimming said portion between said areas to provide finger extensions to provide elongated individual fingers, bending the fingers intermediately into angular divergence, bending the fingers angularly relative to said bead and also into proximate relation to the back of the body, and bending the finger extremities to decrease the divergent angularity thereof relative to the remaining portions of the fingers as well as to position the terminals of the extremities in spaced relation to said remaining finger portions and said bead for trim retaining engagement with a wheel.

3. A method of making a wheel trim, which comprises the steps of shaping and trimming a sheet metal blank into a circular body to provide a convex-concave annular cross-section bordered by a partially formed outer peripheral bead from which extends radially outwardly a series of fingers, bending the fingers angularly in the opposite direction from the curl of the bead, completing the bead and bending the fingers in the completion of the bead into proximate relation to the convex back of said annular section, and bending the extremity portions of the fingers into divergent angularity to the remainder of the fingers.

4. In a method of making a wheel trim, the steps of shaping and trimming a sheet metal blank into a circular body to provide at least a portion of it with a convex-concave annular cross-section bordered by a partially turned edge from which extend radially outwardly a series of fingers, further turning said edge and bending the fingers angularly away from said edge into substantially abutting relation to the convex back of said annular section in the completion of the edge, and bending the extremity portions of the fingers into divergent angularity to the remainder of the fingers.

References Cited in the file of this patent
UNITED STATES PATENTS

| Number | Name | Date |
| --- | --- | --- |
| 413,667 | Hodgson | Oct. 29, 1889 |
| 1,580,278 | Bartels | Apr. 13, 1926 |
| 1,679,248 | Keas | July 31, 1928 |
| 1,716,637 | Hovey | June 11, 1929 |
| 1,926,141 | Cross | Sept. 12, 1933 |
| 1,932,407 | Hothersall | Oct. 31, 1933 |
| 2,078,016 | Poux | Apr. 20, 1937 |
| 2,089,972 | Lyon | Aug. 17, 1937 |
| 2,112,231 | Speidel | Mar. 29, 1938 |
| 2,195,086 | Hall | Mar. 26, 1940 |
| 2,197,609 | Cornell | Apr. 16, 1940 |
| 2,241,735 | Redsecker | May 13, 1941 |
| 2,316,346 | Lyon | Apr. 13, 1943 |
| 2,386,223 | Lyon | Oct. 9, 1945 |
| 2,408,778 | Huppert | Oct. 8, 1946 |
| 2,444,054 | Lyon | June 29, 1948 |

OTHER REFERENCES

Metals Handbook, 1948 Ed. Pub. by The Amer. Society for Metals, Cleveland, Ohio. (Copy in Div. 14.)